UNITED STATES PATENT OFFICE.

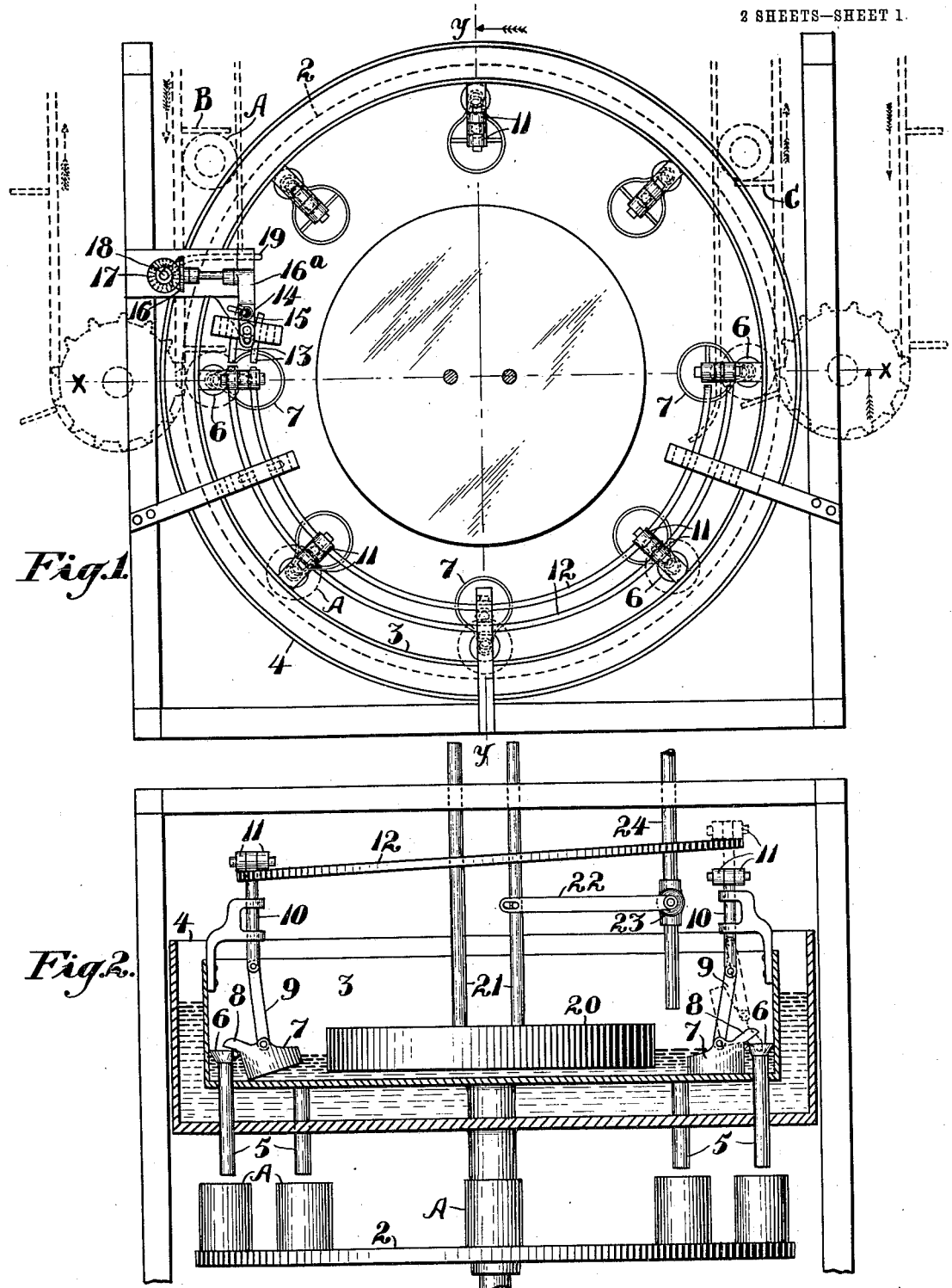

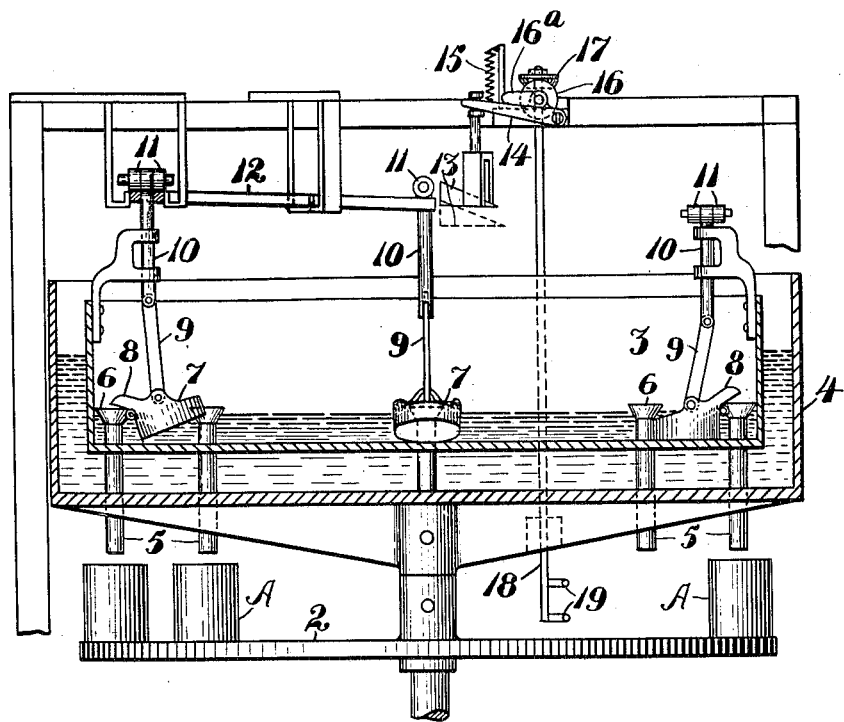

LOZELLE F. GRAHAM, OF SAN JOSE, CALIFORNIA.

FRUIT-SYRUPING MACHINE.

No. 825,598.     Specification of Letters Patent.     Patented July 10, 1906.

Application filed November 6, 1905. Serial No. 286,024.

*To all whom it may concern:*

Be it known that I, LOZELLE F. GRAHAM, a citizen of the United States, residing at San Jose, in the county of Santa Clara and State of California, have invented new and useful Improvements in Fruit-Syruping Machines, of which the following is a specification.

My invention relates to an apparatus which is designed for filling cans with syrup after said cans have been filled with fruit and the fruit subsequently washed.

It consists in a combination of mechanism and details of construction which will be more fully explained by reference to the accompanying drawings, in which—

Figure 1 is a plan view of my apparatus. Fig. 2 is a sectional view taken on line X X of Fig. 1. Fig. 3 is a sectional view taken on line Y Y of Fig. 1.

It is the object of my present invention to provide an apparatus by which cans containing fruit previously prepared may be filled with syrup and made ready for the final placing of the caps and the sealing of the cans.

As shown in the drawings, the cans A are brought to the apparatus by an endless traveling belt having projecting arms B, which engage the cans and advance them to a point where they are delivered upon a circular disk or table 2, and this table is rotated by suitable mechanism (not here shown) beneath a tank 3, which contains syrup and is duly supplied therewith from time to time. This tank is surrounded by an exterior water-containing tank 4, which may serve to maintain a proper temperature for the ready flow of the syrup within the tank. Through the bottom of both inner and outer tanks pass pipes 5. The upper and inner ends of the pipes terminate in funnels 6 within the syrup-containing tank 3 and above the normal level of the syrup.

The cans and tanks are revolved in unison, so that when a can has been placed upon the table 2 it remains in line with its filling-tube 5 until that operation has been completed.

The filling is effected by the employment of tilting cups or buckets 7. These cups have nozzles, as at 8, and they are suspended by links 9 from vertically guided and slidable rods 10. When these rods are depressed, the cups 7 are sufficiently submerged within the syrup to be filled. When the rods 10 are lifted, they act through the links 9 to lift the cups, and as the funnels 6 are in line with the nozzles 8 of the cups and the weight of the cups is so disposed that the cups will be tilted as they are lifted it will be seen that the syrup within each cup will be poured into the funnel 6 and passes through its pipe into the open top of the can which registers beneath the pipe 5. In order to properly operate this mechanism, the upper ends of the slidable rods 10 carry horizontally-journaled rollers 11, and these rollers travel upon an incline track 12, so that as they move around a circle they gradually lift the cups and discharge their contents, as previously described.

If by accident or error no can arrives or is placed in position beneath any one of the tubes 5, the device is so disposed as to prevent the rollers 11 riding upon the track 12. This device consists of an incline plane 13, vertically movable at a point in line with the commencement of the track 12. When this plane is in its normal raised position, the rollers 11 will pass beneath it and beneath the track 12. Thus the corresponding syrup-cups will remain in their normal position and not be lifted. When the can is in position, it operates this device as follows: The incline 13 is connected with a tiltable lever 14, which is normally held up by a spring 15. The lever is depressed by a pin carried by a horizontally-journaled beveled gear 16. This gear is engaged by a similar beveled gear 17, fixed upon the upper end of the vertical shaft 18. This shaft is turnable in journals and carries at its lower end projecting arms 19. These arms are in the path of travel of the can which will be received upon the table 2. If no can is received, the arms 19, being untouched, will not act to revolve the shaft 18, and the connected parts and the incline 13 will remain, as before described, in such position that the rollers 11 will pass beneath it, and the syrup-can will not be raised or tilted. When a can arrives upon the table 2, it contacts with the arms 19, and thus rotates the shaft 18 a small portion of a revolution. This turns the pinion 17, through it the pinion 16, which acts through its arm or lug 16ª to depress the arm 14, and with it the incline 13, so that the lower edge of the incline 13 will be in position shown in dotted lines and will direct the rollers 11 upon the incline 12, and the continued travel of the apparatus will tilt and empty the cups, as previously described. After the cups have been fully emptied the roller 11 will have reached the end of the incline arc 12 and will then drop down to them normal position, thus returning the cups to their normal position and allowing them again to be submerged and filled with the syrup. The cans after being thus filled will arrive at a second traveling belt upon the opposite side of the apparatus from the one first named, and by means of similar arms or lugs, as at C, the cans will be removed from the table 2 and transferred to the next apparatus.

A float 20, having guide-rods 21, regulates the normal level of the syrup by a suitable lever 22, connecting a valve 23 on a syrup-supply pipe 24, which is connected to a tank containing syrup, but not here shown.

Having thus described my invention, what I claim, and desire to secure by Letters Patent, is—

1. In apparatus for filling cans with syrup, a revoluble disk or table upon which the cans are successively placed, a syrup-containing tank located above and revoluble in unison with the table, conducting-tubes leading through the bottom of the tank having their mouths located above the surface of the syrup, tiltable cups, means by which they are alternately submerged within the syrup and automatically raised to discharge their contents into the conductors and cans.

2. In an apparatus for filling cans with syrup, a horizontally-revoluble table upon which the cans are successively placed, a syrup-containing tank located above the table, and cans revoluble in unison therewith and having conducting-tubes extending above the surface of the syrup in the tank and terminating in line above the open mouths of the cans, suspended cups coincident with each of the conductors, and having discharge spouts or nozzles which register with said conductors, mechanism by which said cups are first submerged within the syrup and subsequently automatically raised and tilted to discharge their contents through the conductors and into the cans.

3. In an apparatus for filling cans with syrup, a horizontally-revoluble table upon which cans are successively placed, a syrup-containing tank located above the table and cans and revoluble in unison therewith, conductors having their upper ends located above the level of the syrup within the tank, and their lower ends registering with the open mouths of the cans, tiltable suspended cups, means by which they are suspended, an inclined track and rollers connected with the cups, and suspending devices adapted to travel upon said tracks whereby the cups are raised to discharge their contents into the conductors.

4. In an apparatus for filling cans with syrup, a horizontally-revoluble table upon which cans are successively placed, a syrup-containing tank located above the table and revoluble in unison therewith, conductors having the upper ends located above the level of the syrup in the tank and the lower ends registering with the open mouths of the cans, tiltable cups, vertically-slidable rods by which said cups are suspended, rollers carried by said rods, an inclined segmental track, means for directing the rollers upon said track whereby the revolution of the apparatus raises the cups from the syrup and allows them to tilt and discharge their contents into the corresponding conductors, said rollers dropping from the end of the track and allowing the cups to again fall and become submerged.

5. In an apparatus for filling cans with syrup, a horizontally-revoluble table upon which the cans are successively placed, a syrup-containing tank located above the table and revoluble in unison therewith, conductors having their upper ends located above the level of the syrup within the tank and the lower ends registering with the open mouths of the cans beneath, cups suspended and tiltable when lifted to discharge their contents into the corresponding conductors, vertically-slidable rods, a segmental track and rollers carried by the rods and adapted to travel upon the track so as to raise and discharge the cups and to allow them to drop when the end of the track has been reached, a vertically-movable incline coincident with the lower end of the track whereby the rollers are raised and shunted upon the track.

6. In an apparatus for filling cans with syrup, a horizontally-revoluble table, a superposed syrup-tank with conductors and tiltable syrup-cups, vertically-slidable rods from which the cups are suspended, rollers carried by the rods, a fixed inclined track upon which said rollers travel to raise and empty the cups, means controlled by the cans upon the table by which the rollers are directed and the cups lifted, said means comprising vertical rotatable shafts having arms projecting so as to be engaged by the passing cans, and mechanism actuated by the rotation of the shaft whereby the rollers and suspending rods are caused to travel upon the inclined track.

7. In an apparatus for filling cans with syrup, a horizontally-revoluble table, a superposed syrup-tank, conductors leading therefrom to the cans, tiltable cups adapted to be alternately submerged in the syrup and lifted to discharge into the conductors by which said cups are operated only when cans are in position, said means comprising a rotatable shaft having arms projecting so that by contact of the cans the shaft will be rotated, a cam-arm actuated by the rotation of the shaft, a lifter connected therewith, an inclined plane carried by the lifter, and an incline track with which said plane is caused to register only when cans are in position to be filled.

In testimony whereof I have hereunto set my hand in presence of two subscribing witnesses.

LOZELLE F. GRAHAM.

Witnesses:
S. H. NOURSE,
D. B. RICHARDS.